United States Patent
Garcia (10) Patent No.: US 11,634,583 B2
(45) Date of Patent: Apr. 25, 2023

(54) CERAMIC MATERIALS COMPRISING PRECERAMIC RESIN FORMULATIONS, AND RELATED ARTICLES AND METHODS

(71) Applicant: Northrop Grumman Systems Corporation, Falls Church, VA (US)

(72) Inventor: Benjamin W. C. Garcia, Tremonton, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 32 days.

(21) Appl. No.: 16/916,374

(22) Filed: Jun. 30, 2020

(65) Prior Publication Data

US 2020/0332125 A1 Oct. 22, 2020

Related U.S. Application Data

(62) Division of application No. 15/651,970, filed on Jul. 17, 2017, now Pat. No. 10,731,036.

(51) Int. Cl.
| | |
|---|---|
| *C08L 83/16* | (2006.01) |
| *C08L 83/04* | (2006.01) |

(Continued)

(52) U.S. Cl.
CPC .............. *C08L 83/16* (2013.01); *C04B 35/14* (2013.01); *C04B 35/515* (2013.01);
(Continued)

(58) Field of Classification Search
CPC ...... C08L 83/16; C08L 2312/08; C08L 83/04; C04B 35/14; C04B 35/806; C04B 35/571;
(Continued)

(56) References Cited

U.S. PATENT DOCUMENTS

| | | | | | |
|---|---|---|---|---|---|
| 4,105,455 | A | * | 8/1978 | Koga | .................... C01B 32/977 264/125 |
| 4,220,600 | A | * | 9/1980 | Yajima | .................. C01B 32/977 556/434 |

(Continued)

FOREIGN PATENT DOCUMENTS

| | | |
|---|---|---|
| DE | 102011055285 B3 | 2/2013 |
| EP | 0718254 A2 | 6/1996 |

(Continued)

OTHER PUBLICATIONS

Database WPI Week 199220 Thomson Scientific, London, GB; AN 1992-162725 XP002797265, Copyright 2017.

(Continued)

*Primary Examiner* — Noah S Wiese
(74) *Attorney, Agent, or Firm* — TraskBritt (57) ABSTRACT

A preceramic resin formulation comprising a polycarbosilane preceramic polymer and an organically modified silicon dioxide preceramic polymer. A ceramic material comprising a reaction product of the polycarbosilane preceramic polymer and organically modified silicon dioxide preceramic polymer is also described. Articles comprising the ceramic material are also described, as are methods of forming the preceramic resin formulation and the ceramic material.

20 Claims, 3 Drawing Sheets

(51) Int. Cl.
| | |
|---|---|
| *C04B 35/571* | (2006.01) |
| *C04B 35/14* | (2006.01) |
| *F02K 1/82* | (2006.01) |
| *F02C 7/00* | (2006.01) |
| *F01D 5/28* | (2006.01) |
| *F02K 9/00* | (2006.01) |
| *C04B 35/515* | (2006.01) |
| *C04B 35/80* | (2006.01) |
| *F02K 9/97* | (2006.01) |
| *F02K 9/34* | (2006.01) |
| *C08G 77/60* | (2006.01) |
| *C08G 77/20* | (2006.01) |

(52) U.S. Cl.
CPC ............ *C04B 35/571* (2013.01); *C04B 35/80* (2013.01); *C08L 83/04* (2013.01); *F01D 5/284* (2013.01); *F02C 7/00* (2013.01); *F02K 1/822* (2013.01); *F02K 9/00* (2013.01); *C04B 2235/3418* (2013.01); *C04B 2235/3826* (2013.01); *C04B 2235/483* (2013.01); *C04B 2235/60* (2013.01); *C04B 2235/6567* (2013.01); *C04B 2235/80* (2013.01); *C08G 77/20* (2013.01); *C08G 77/60* (2013.01); *C08L 2312/08* (2013.01); *F02K 9/34* (2013.01); *F02K 9/974* (2013.01); *F05D 2230/20* (2013.01); *F05D 2230/30* (2013.01); *F05D 2230/90* (2013.01); *F05D 2300/22* (2013.01); *F05D 2300/222* (2013.01); *F05D 2300/226* (2013.01); *F05D 2300/2261* (2013.01)

(58) Field of Classification Search
CPC ........ C04B 2235/80; C04B 2235/6567; C04B 2235/483; C04B 2235/3418; C04B 2235/3826; C04B 2235/60; F02C 7/00; F02K 9/00; F02K 9/974; F02K 1/822; F01D 5/284; F05D 2300/222; F05D 2300/226; F05D 2300/22; F05D 2300/2261; F05D 2230/90; F05D 2230/30; F05D 2230/20
See application file for complete search history.

(56) References Cited

U.S. PATENT DOCUMENTS

| | | | |
|---|---|---|---|
| 4,248,814 A | 2/1981 | Yajima et al. | |
| 4,414,403 A | 11/1983 | Schilling et al. | |
| 4,681,860 A | 7/1987 | Bujalski | |
| 4,719,273 A | 1/1988 | Seyferth et al. | |
| 4,737,552 A * | 4/1988 | Baney .................. | C04B 35/571 501/88 |
| 4,921,917 A | 5/1990 | Burns | |
| 5,082,872 A | 1/1992 | Burns et al. | |
| 5,334,414 A | 8/1994 | Edie et al. | |
| 5,356,499 A | 10/1994 | Decker et al. | |
| 5,780,126 A | 7/1998 | Smith et al. | |
| 5,872,070 A | 2/1999 | Dismukes et al. | |
| 6,013,711 A | 1/2000 | Lewis et al. | |
| 6,365,698 B1 | 4/2002 | Goldslager et al. | |
| 7,628,878 B2 | 12/2009 | Riedell et al. | |
| 8,466,076 B2 | 6/2013 | Ruedinger et al. | |
| 8,492,476 B2 | 7/2013 | Monden | |
| 8,604,149 B2 | 12/2013 | Clade et al. | |
| 8,658,755 B2 | 2/2014 | Saito | |
| 8,919,254 B2 | 12/2014 | Diehl et al. | |
| 9,102,571 B2 | 8/2015 | Szweda et al. | |
| 9,412,970 B2 | 8/2016 | Han et al. | |
| 10,322,974 B2 | 6/2019 | Land et al. | |
| 2006/0177686 A1 | 8/2006 | Henager et al. | |
| 2009/0252971 A1 | 10/2009 | Saha et al. | |
| 2009/0324930 A1 | 12/2009 | Tulyani et al. | |
| 2010/0015396 A1 | 1/2010 | Johnson et al. | |
| 2010/0255289 A1 | 10/2010 | Lewinsohn et al. | |
| 2011/0098420 A1 | 4/2011 | Takizawa et al. | |
| 2011/0210344 A1 | 9/2011 | Han et al. | |
| 2011/0318549 A1 | 12/2011 | Schmidt et al. | |
| 2012/0065294 A1 | 3/2012 | Gajiwala et al. | |
| 2014/0255635 A1 | 9/2014 | Morgan et al. | |
| 2014/0356613 A1 | 12/2014 | Weisenberger et al. | |
| 2015/0175750 A1 | 6/2015 | Hopkins et al. | |
| 2015/0284289 A1 | 10/2015 | Gu et al. | |
| 2016/0153288 A1 | 6/2016 | Luthra | |
| 2016/0160664 A1 | 6/2016 | Luthra et al. | |
| 2016/0207781 A1 | 7/2016 | Dukes et al. | |
| 2016/0207836 A1 | 7/2016 | Land et al. | |
| 2017/0144329 A1 | 5/2017 | Dunn et al. | |
| 2019/0016640 A1 | 1/2019 | Garcia et al. | |
| 2020/0032061 A1 | 1/2020 | Garcia et al. | |
| 2020/0062663 A1 | 2/2020 | Garcia | |

FOREIGN PATENT DOCUMENTS

| | | |
|---|---|---|
| EP | 3260434 A1 | 12/2017 |
| JP | 04-100875 A | 4/1992 |

OTHER PUBLICATIONS

EEMS, LLC "Liquid Polymers" Product Chart, 1 page, eems-llc.com/wp-content/.../Custom_Polycarbosiloxanes_and_Polycarbosilanes.pdf, accessed Jun. 8, 17.

EEMS, LLC, "CSO family of Carbosiloxane Polymers" product listing, 2 pages, eems-llc.com, accessed Jun. 8, 2017.

Matech "Introducing Pre-ceramic Polymers", Distribution A: Approved for Public Release; Distribution is unlimited, 2 pagesm http://matechgsm.com/brochures/PolymerPamphlet.pdf, accessed Jun. 8, 2017.

StarPCSTM SMP-10, "Silicon Carbide Matrix Precursor" Technical Data, http://www.starfiresystems.com/docs/ceramic-forming-polymers/SMP-10.pdf, accessed Jun. 8, 2017.

* cited by examiner

Cured Control Formulation    Cured Preceramic Resin Formulation

CERAMIC MATERIALS COMPRISING PRECERAMIC RESIN FORMULATIONS, AND RELATED ARTICLES AND METHODS

CROSS-REFERENCE TO RELATED APPLICATION

This application is a divisional of U.S. patent application Ser. No. 15/651,970, filed Jul. 17, 2017, now U.S. Pat. No. 10,731,036, issued Aug. 4, 2020, the disclosure of which is hereby incorporated herein in its entirety by this reference.

FIELD

Embodiments of the disclosure relate generally to preceramic resin formulations that are resistant to heat and exhibit a high ceramic yield when ceramified. More particularly, embodiments of the disclosure relate to preceramic resin formulations that include a polycarbosilane polymer and an organically modified silicon dioxide polymer, ceramic materials including the preceramic resin formulations, articles comprising the ceramic materials, and methods of forming the preceramic resin formulations and the ceramic materials.

BACKGROUND

Silicon carbide (SiC) and other ceramic materials are used to produce articles having high structural and mechanical strength at a temperature above 1,200° C. (2,200° F.). The articles are commonly used in aerospace and other industries needing resistance to heat. As operation temperatures increase above 1,200° C., material options for the articles decrease exponentially because metal and metal alloys are not viable. While ceramic matrix composites (CMCs) and carbon-carbon (C—C) materials are conventionally used at these temperatures, these materials are expensive and time intensive to produce. Processing of the CMCs and C—C materials requires multiple heat treatments and processing acts to densify the materials and provide the desired strength. Producing CMCs requires several infiltration cycles, which increases the overall cost and amount of time to fabricate the CMCs. Additionally, conventional furnaces used to produce the articles are not sufficiently large to accommodate large articles, such as those needed for large rocket motors.

One method of forming SiC and other ceramic materials is from preceramic polymers. However, conventional preceramic polymers, such as polycarbosilanes, have a low viscosity (less than about 200 cP), which limits their practical use in the preparation of CMCs where the preceramic polymer provides the matrix of the CMC. One commonly-used preceramic polymer is polycarbosilane. However, the polycarbosilane has limited use due to its low viscosity and extensive cracking after curing at, for example, 121° C. (250° F.). Additionally, the ceramic materials formed from conventional preceramic polymers exhibit high mass loss, extensive cracking at low temperature (less than about 121° C.), high porosity, and high shrinkage. Cracking of the ceramic material is worsened as high loading of fillers is needed, rendering the ceramic material formed from the conventional preceramic polymers ineffective. Viscosity modifiers or cracking mitigation additives have been used with conventional preceramic polymers. However, with the modifiers or additives, a low ceramic yield is observed at a temperature greater than about 816° C. (about 1500° F.). Polycarbosilane has also been combined with a polysiloxane, such as polydimethylsiloxane, to improve its viscosity. However, the ceramic yield of the resulting ceramic material was unacceptably low.

BRIEF SUMMARY

In accordance with some embodiments described herein, a preceramic resin formulation is disclosed. The preceramic resin formulation comprises a polycarbosilane preceramic polymer and an organically modified silicon dioxide preceramic polymer.

In additional embodiments, a ceramic material comprising a reaction product of the polycarbosilane preceramic polymer and the organically modified silicon dioxide preceramic polymer is disclosed.

In further embodiments, a method of forming a preceramic resin formulation is disclosed and comprises combining the polycarbosilane preceramic polymer, the organically modified silicon dioxide preceramic polymer, and a crosslinking agent.

In yet other embodiments, a method of forming the ceramic material is disclosed and comprises forming the preceramic resin formulation, curing the preceramic resin formulation to form a cured preceramic resin formulation, and ceramifying the cured preceramic resin formulation to form the ceramic material.

In yet still other embodiments, an article is disclosed. The article comprises a reaction product of a polycarbosilane preceramic polymer and an organically modified silicon dioxide preceramic polymer, the article configured as a component of a rocket motor or of a high temperature aerostructure.

DETAILED DESCRIPTION

A preceramic resin formulation including at least one silicon carbide precursor and at least one silicon dioxide precursor is disclosed. The silicon carbide precursor and silicon dioxide precursor differ in viscosity, enabling a viscosity of the preceramic resin formulation to be tailored by adjusting the relative amounts of the silicon carbide precursor and silicon dioxide precursor in the preceramic resin formulation. The tailorable viscosity of the preceramic resin formulation increases the extent and nature of applications in which the preceramic resin formulation may be used. By way of example only, the viscosity of the preceramic resin formulation may be tailored so that the preceramic resin formulation may be used to prepare CMCs where the preceramic resin formulation functions as the matrix of the composite. The preceramic resin formulation may be cured (e.g., crosslinked) and ceramified (e.g., pyrolyzed) to form a ceramic material. The ceramic material formed from the preceramic resin formulation may be formulated to exhibit desired material properties (e.g., rheological properties, mechanical properties, physical properties, chemical properties). The ceramic material exhibits a low mass loss, a high ceramic yield, and a low porosity when ceramified at a temperature greater than about 816° C. (greater than about 1500° F.). The ceramic material exhibits improved performance properties (e.g., strength) than each of the preceramic precursors individually. The tailorable viscosity of the preceramic resin formulation may be achieved without losing ceramic yield during the conversion to the ceramic material. An article formed from the ceramic material also exhibits reduced or no cracking. The article may be produced by conventional composite fabrication methods, reducing the complexity and cost of fabricating the article.

As used herein, the term "ceramic material" means and includes a reaction product of the silicon carbide precursor and silicon dioxide precursor following cure and ceramification of the preceramic resin formulation.

As used herein, the term "ceramic yield" means and includes a residual mass of the ceramic material remaining after cure and ceramification of the preceramic resin formulation at a temperature of up to about 900° C. (up to about 1,652° F.).

As used herein, the term "cured preceramic resin formulation" means and includes the preceramic resin formulation after curing and before ceramifying.

As used herein, the term "preceramic" means and includes a polymer material that is converted to a ceramic material when heated to a temperature of greater than about 816° C. (greater than about 1500° F.).

As used herein, the term "preceramic resin formulation" means and includes a formulation of the silicon carbide precursor and silicon dioxide precursor before curing and ceramifying.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a pre-determined way.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

The following description provides specific details, such as materials, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing the article from the preceramic resin formulation. Only those process acts and structures necessary to understand the embodiments of the disclosure are described in detail below. Additional acts to form the article from the preceramic resin formulation may be performed by conventional techniques. Also note, any drawings accompanying the application are for illustrative purposes only, and are thus not drawn to scale. Additionally, elements common between figures may retain the same numerical designation.

The silicon carbide precursor and silicon dioxide precursor may differ in viscosity from one another by at least one order of magnitude. The silicon carbide precursor may, for example, have a viscosity of less than or equal to about 250 cP at a temperature of about 25° C. while the silicon dioxide precursor may have a viscosity of greater than or equal to about 2,500 cP at a temperature of about 25° C. While embodiments herein describe the silicon carbide precursor as having a lower viscosity than the silicon dioxide precursor, the silicon carbide precursor may have a higher viscosity than the silicon dioxide precursor as long as the viscosities of the two preceramic precursors differ by at least one order of magnitude. By selecting the viscosities of each of the silicon carbide precursor and silicon dioxide precursor, the viscosity of the preceramic resin formulation may be tailored as desired.

The silicon carbide precursor is a polycarbosilane preceramic polymer formed of monomers having the following chemical structure:

where $R_1$ and $R_2$ of each monomer is independently a hydrogen (H) group, a methyl ($CH_3$) group, or a vinyl group ($CH_2$=CH) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. At least a portion of the monomers in the polycarbosilane preceramic polymer include the vinyl group as $R_1$ or $R_2$ to enable crosslinking with the organically modified silicon dioxide preceramic polymer during cure of the preceramic resin formulation. The amount of vinyl groups in the polycarbosilane preceramic polymer may be sufficient to crosslink the preceramic resin formulation. The polycarbosilane preceramic polymer may include at least about 0.01 vinyl eq/kg, such as from about 0.2 vinyl eq/kg to about 5.0 vinyl eq/kg. The polycarbosilane preceramic polymer may also include at least about 0.01 hydride eq/kg, such as from about 0.2 hydride eq/kg to about 10 hydride eq/kg. The polycarbosilane preceramic polymer may be photocurable, chemically curable, or thermally curable.

By selecting the $R_1$ and $R_2$ groups of each monomer and the degree of polymerization (i.e., the number of monomer repeat units), a desired viscosity of the polycarbosilane preceramic polymer may be achieved. The polycarbosilane preceramic polymer is formulated to exhibit a viscosity of less than or equal to about 250 cP at a temperature of about 25° C., such as from about 1 cP to about 250 cP at about 25° C., from about 1 cP to about 200 cP at about 25° C., from about 1 cP to about 100 cP at about 25° C., from about 10 cP to about 250 cP at about 25° C., from about 10 cP to about 200 cP at about 25° C., from about 40 cP to about 250 cP at about 25° C., from about 40 cP to about 200 cP at about 25° C., from about 40 cP to about 120 cP at about 25° C., from about 40 cP to about 100 cP at about 25° C., from about 5 cP to 8 cP at about 25° C., from about 4 cP to 7 cP at about 25° C., from about 8 cP to 12 cP at about 25° C., from about 8 cP to 15 cP at about 25° C., or from about 200 cP to about 250 cP at about 25° C. In some embodiments, the polycarbosilane preceramic polymer has a viscosity of from about 40 cP to about 120 cP at about 25° C.

Such polycarbosilane preceramic polymers are commercially available from numerous sources including, but not limited to, EEMS, LLC (Saratoga Springs, N.Y.), Starfire Systems, Inc. (Schenectady, N.Y.), or Matech (Westlake Village, Calif.). The polycarbosilane preceramic polymer may include, but is not limited to, SMP-10, StarPCS® SMP-500, or StarPCS® SMP-877 silicon carbide precursor from Starfire Systems, Inc. (Malta, N.Y.). Additional polycarbosilane preceramic polymers are commercially available from EEMS, LLC as MS 208, MS 272, MS 250, MS 440, CSO 110, or CSO 116. The polycarbosilane preceramic polymer may also include a combination of polycarbosilane preceramic polymers or a combination of the polycarbosilane preceramic polymer with at least one other polymer, such as a polysiloxane or other compatible polymer. The polycarbosilane preceramic polymer may be available at a relatively low cost, such as less than about $100/pound.

Commercially available polycarbosilane preceramic polymers may also include a combination of the polycarbosilane preceramic polymer.

The silicon dioxide precursor is an organically modified silicon dioxide preceramic polymer formed of monomers having the following chemical structure:

where each of $R_3$ and $R_4$ is independently a methyl ($CH_3$) group or a vinyl group ($CH_2$=CH) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. The organically modified silicon dioxide preceramic polymer includes a quaternary coordinated (QC) oxygen to silicon atom and may also be referred to as a QC silicon dioxide preceramic polymer. At least a portion of the monomers in the organically modified silicon dioxide preceramic polymer may, optionally, include the vinyl group as $R_3$ or $R_4$ to enable crosslinking with the polycarbosilane preceramic polymer during cure of the preceramic resin formulation. The organically modified silicon dioxide preceramic polymer may include from about 0 vinyl eq/kg to about 5.0 vinyl eq/kg, such as from about 0.18 vinyl eq/kg to about 0.3 vinyl eq/kg. The organically modified silicon dioxide preceramic polymer may be photocurable, chemically curable, or thermally curable.

$R_3$ and $R_4$ of each monomer of the organically modified silicon dioxide preceramic polymer and the degree of polymerization are selected to provide the desired viscosity to the organically modified silicon dioxide preceramic polymer. The organically modified silicon dioxide preceramic polymer also has a low carbon content and a high degree of quaternary coordinated oxygen to the silicon atoms in the polymer chain. The organically modified silicon dioxide preceramic polymer is formulated to exhibit a viscosity greater than about 200 cP at a temperature of about 25° C., such as greater than about 2,500 cP at a temperature of about 25° C., from about 3,000 cP to about 100,000 cP at about 25° C., from about 4,000 cP to about 100,000 cP at about 25° C., from about 5,000 cP to about 100,000 cP at about 25° C., from about 6,000 cP to about 100,000 cP at about 25° C., from about 4,500 cP to about 7,000 cP at about 25° C., from about 40,000 cP to about 80,000 cP at about 25° C., from about 45,000 cP to about 75,000 cP at about 25° C., from about 50,000 cP to about 70,000 cP at about 25° C., or from about 50,000 cP to about 60,000 cP at about 25° C. In some embodiments, the organically modified silicon dioxide preceramic polymer has a viscosity of from about 50,000 cP to about 60,000 cP at a temperature of about 25° C. In other embodiments, the organically modified silicon dioxide preceramic polymer has a viscosity of from about 4,500 cP to about 7,000 cP at about 25° C.

Such organically modified silicon dioxide preceramic polymers are commercially available from numerous sources including, but not limited to, Gelest, Inc. (Morrisville, Pa.). The organically modified silicon dioxide preceramic polymer may include, but is not limited to, VQM 135, VQM 135R, VQM 146, or combinations thereof.

The preceramic resin formulation also includes a crosslinking agent, such as a radical initiator, a cationic initiator, or a hydrosilylation catalyst. The crosslinking agent initiates crosslinking of the polycarbosilane preceramic polymer and organically modified silicon dioxide preceramic polymer by reacting the vinyl groups with silicon-hydrogen groups in the preceramic resin formulation. The radical initiator may be a peroxide compound or an azo compound used to cure (e.g., crosslink) the polycarbosilane preceramic polymer and the organically modified silicon dioxide preceramic polymer. The peroxide compound may include, but is not limited to, benzoyl peroxide, dicumyl peroxide, bis-(2,4-dichlorobenzoyl)-peroxide, or combinations thereof. The azo compound may include, but is not limited to, azobisisobutyronitrile. The cationic initiator may include a protonic acid, a Lewis acid/Friedel-Crafts catalyst e.g., $SnCl_4$, $AlCl_3$, $BF_3$, and $TiCl_4$), carbenium ion salts (e.g., with trityl or tropylium cations), or through ionizing radiation. The hydrosilylation catalyst may be a transition metal catalyst, such as platinum, rhodium, ruthenium iridium, palladium, nickel, cobalt, iron, manganese, or combinations thereof. In some embodiments, the crosslinking agent is a platinum catalyst. The crosslinking agent may be present at an amount sufficient to react (e.g., crosslink) the polycarbosilane preceramic polymer and organically modified silicon dioxide preceramic polymer and at least partially depends on the polycarbosilane preceramic polymer and organically modified silicon dioxide preceramic polymer used, as well as on the desired cure time of the preceramic resin formulation. The crosslinking agent may, for example, be present in the preceramic resin formulation at from about 0.01 parts per hundred parts of resin (phr) to about 2.5 phr, such as from about 0.5 phr to about 2.0 phr, or about 1.0 phr.

The preceramic resin formulation may include optional components (e.g., additives) to provide desirable properties to the ceramic material formed from the preceramic resin formulation. If present, the additive may be at least one compound that enhances at least one material property (e.g., ceramic yield, extent of cracking) of the ceramic material to be formed from the preceramic resin formulation. By way of example only, the additive may be a cure accelerator, an adhesion promoter, a lubricant, a filler, a pigment, or combinations thereof. Such additives are known in the art and are not described in detail herein. In some embodiments, the preceramic resin formulation is substantially free of additives other than the crosslinking agent. Thus, the preceramic resin formulation consists essentially of or consists of the polycarbosilane preceramic polymer, organically modified silicon dioxide preceramic polymer, and the crosslinking agent.

The preceramic resin formulation may include from about 10% by weight (wt %) to about 90 wt % of the polycarbosilane preceramic polymer and from about 10 wt % to about 90 wt % of the organically modified silicon dioxide preceramic polymer. The amount of each of the polycarbosilane preceramic polymer and the organically modified silicon dioxide preceramic polymer present in the preceramic resin formulation may be selected depending on the desired properties of the ceramic material to be formed. In some embodiments, the preceramic resin formulation includes 80 wt % of the polycarbosilane preceramic polymer, 20 wt % of the organically modified silicon dioxide preceramic polymer, and about 1.0 phr of the crosslinking agent. By way of example only, the polycarbosilane preceramic polymer is CSO 110 from EEMS, LLC and is present at about 100 parts, the organically modified silicon dioxide preceramic polymer is VQM-246 from Gelest, Inc. and is present at about 25 parts, and the crosslinking agent is a platinum catalyst (EEMS CLC-PL005 from Gelest, Inc.) and is present at about 1 part.

The preceramic resin formulation may be formed by mixing the polycarbosilane preceramic polymer, the organically modified silicon dioxide preceramic polymer, and the crosslinking agent, along with any optional additives. The polycarbosilane preceramic polymer, organically modified silicon dioxide preceramic polymer, and crosslinking agent may be mixed by conventional techniques, such as by hand, using a high shear mixer, or using a planetary mixer. Mixing the components under vacuum may remove gases from the preceramic resin formulation, which inhibits the formation of voids or pores during curing and during the conversion of the preceramic resin formulation to the ceramic material. The components may be mixed under inert conditions, such as under argon. The polycarbosilane preceramic polymer, organically modified silicon dioxide preceramic polymer, and crosslinking agent may be mixed for an amount of time sufficient to form a substantially homogeneous preceramic resin formulation (e.g., the polycarbosilane preceramic polymer, organically modified silicon dioxide preceramic polymer, and crosslinking agent may be uniformly dispersed throughout the preceramic resin formulation), or may be heterogeneous (e.g., at least one of the polycarbosilane preceramic polymer, organically modified silicon dioxide preceramic polymer, and crosslinking agent may be non-uniformly dispersed throughout the preceramic resin formulation). In some embodiments, the preceramic resin formulation is substantially homogeneous as formed. Organic solvents may, optionally, be used to form the preceramic resin formulation. During mixing, the preceramic resin formulation may be maintained at a temperature below the lowest cure temperature of each of the components. In one embodiment, the polycarbosilane preceramic polymer, organically modified silicon dioxide preceramic polymer, and crosslinking agent are maintained at room temperature (from about 20° C. to about 25° C.) during mixing. A water-cooled jacket may be used, as needed, to maintain the preceramic resin formulation at or near room temperature to inhibit potential reactions from occurring during the mixing.

The preceramic resin formulation may exhibit a viscosity within a range of from about 200 cP at about 25° C. to about 5,500 cP at a temperature of about 25° C., such as from about 800 cP at about 25° C. to about 5,000 cP at a temperature of about 25° C. or from about 1,000 cP at about 25° C. to about 5,000 cP at a temperature of about 25° C.

The preceramic resin formulation may be formed (e.g., fabricated) into a desired configuration or shape depending on the intended use of the ceramic material. By way of example only, the preceramic resin formulation may be formed into a desired shape by coating, casting into a mold, dispensing from a container onto a surface as an adhesive or sealant, hand placement (lay up), molding, such as vacuum bag molding or resin transfer molding, filament winding, such as wet filament winding, another suitable process, or combinations thereof. Once formed into the desired shape, the preceramic resin formulation is cured (e.g., crosslinked) to form a cured preceramic resin formulation and ceramified (e.g., pyrolyzed) to form the ceramic material. The conditions used to cure the preceramic resin formulation may be selected depending on the specific polycarbosilane preceramic polymer and organically modified silicon dioxide preceramic polymer present in the preceramic resin formulation. The cure temperature of the preceramic resin formulation may range from about 0° C. (about 32° F.) to about 400° C. (about 752° F.), such as from about 20° C. to about 371° C. or from about 20° C. to about 121° C. (about 250° F.). Depending on the cure temperature, the preceramic resin formulation may be cured in an amount of time ranging from a few seconds (e.g., photoinitiated cure) to a few days. By increasing the cure temperature, a shorter amount of time may be needed to cure the preceramic resin formulation. Conversely, by decreasing the cure temperature, a longer amount of time may be needed to cure the preceramic resin formulation. The curing of the preceramic resin formulation may be conducted using conventional processing equipment, which is not described in detail herein. During curing, the polycarbosilane preceramic polymer and organically modified silicon dioxide preceramic polymer in the preceramic resin formulation react (e.g., crosslink), forming a hardened material (i.e., the cured preceramic resin formulation). Thus, the cured preceramic resin formulation includes a reaction product of the polycarbosilane preceramic polymer and the organically modified silicon dioxide preceramic polymer. By way of example only, the vinyl groups of the preceramic resin formulation react with silicon-hydrogen bonds during the cure.

The cured preceramic resin formulation is ceramified to further harden the cured preceramic resin formulation and convert the cured preceramic resin formulation into the ceramic material. Thus, the ceramic material includes a reaction product of the polycarbosilane preceramic polymer and the organically modified silicon dioxide preceramic polymer. The cured preceramic resin formulation may be exposed to a temperature of greater than about 649° C. (greater than about 1,200° F.), such as a temperature of greater than about 816° C. (greater than about 1,500° F.) or greater than about 1,093° C. (greater than about 2,000° F.). The ceramic yield of the ceramic material may be greater than about 50%, such as greater than about 70%, greater than about 75%, or greater than about 80% when ceramified at these temperatures. Without being bound by any theory, it is believed that the high degree of quaternary coordinate oxygen in the organically modified silicon dioxide preceramic polymer results in the high ceramic yield. When silicon atoms are fully coordinated with oxygen atoms, $SiO_2$ is maintained during the cure and ceramification. The organically modified silicon dioxide preceramic polymer has sufficient organic groups bonded to the silicon atoms to keep the preceramic resin formulation in a polymeric state, which enables ease of blending with other materials. It is also believed that at a temperature of about 1,093° C. (about 2,000° F.), the preceramic resin formulation may be characterized as a semi-amorphous silicon-oxy-carbide material.

With its heat resistance and reduced cracking, the ceramic material formed from the preceramic resin formulation may be used in a variety of articles, such as in aerospace or other industries. The ceramic material according to embodiments of the disclosure may be used to form components of rocket motors or other aerostructures. The ceramic material according to embodiments of the disclosure may be used as a structural component of a rocket motor or of a high temperature aerostructure. The ceramic material may be used as a component of a nozzle of the rocket motor or of a casing of the rocket motor. The aerostructure may include, but is not limited to, a turbine, a turbine blade, a turbine housing, a turbine engine vane, an insulating tile, a rotor blade, an insulation blanket, a compressor blade, a wing component, a fuselage skin, a landing gear, an exhaust nozzle, an engine exhaust duct, a nose cone, a re-entry shield, or a heat shield. In addition to structural components, the ceramic material may be used as an oxidative resistant coating on a rocket motor nozzle or other high temperature aerostructure, a high temperature adhesive, a mortar material for filling cracks or gaps, an insulation, a thermal protection material, a thermal ablation material, or a matrix material of a ceramic matrix composite (CMC). The ceramic material according to embodiments of the disclosure may also be used as a bonding material between other components, such as between other components of a rocket motor or other components of an aerostructure. The ceramic material may, therefore, be part of a laminate structure that includes aerostructure components or rocket motor components.

Figure 1:
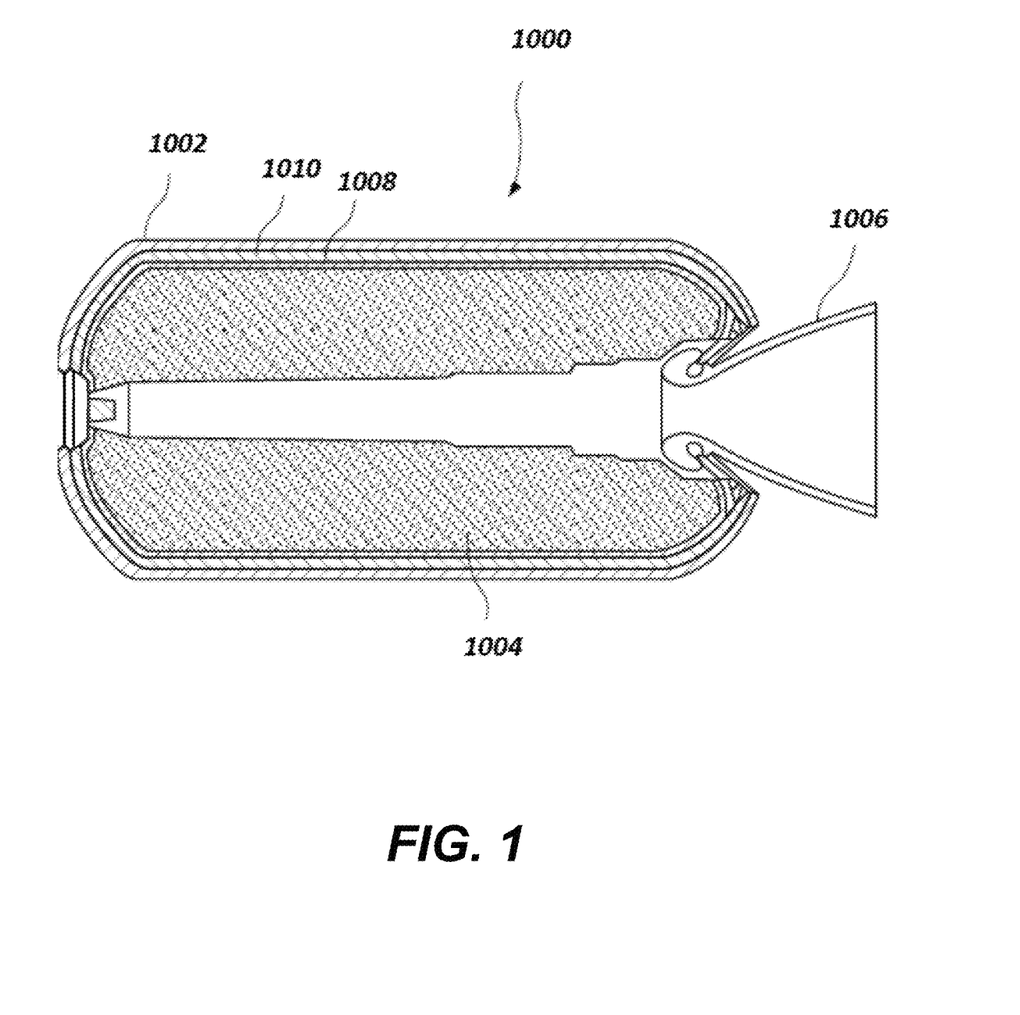
FIG. 1 is a simplified cross-sectional view of a rocket motor including one or more ceramic material components in accordance with embodiments of the disclosure.

FIG. 1 is a simplified cross-sectional view of a rocket motor 1000 (e.g., a solid rocket motor), in accordance with embodiments of the disclosure. The rocket motor 1000 may, for example, be configured to be a component (e.g., stage) of a larger assembly (e.g., a multi-stage rocket motor assembly). As shown in FIG. 1, the rocket motor 1000 includes a casing 1002, a propellant structure 1004 disposed within the casing 1002, and a nozzle assembly 1006 connected to an aft end of the casing 1002. The rocket motor 1000 may also include one or more of a liner structure 1008 and an insulation structure 1010 between the propellant structure 1004 and the casing 1002. For example, the liner structure 1008 may be located on or over the propellant structure 1004, and the insulation structure 1010 may be located on and between the liner structure 1008 and an inner surface of the casing 1002. The components of the rocket motor 1000 may be formed using conventional processes and equipment, which are not described in detail herein. The ceramic material according to embodiments of the disclosure may be used in one or more components of the rocket motor 1000. By way of example only, at least a portion of the nozzle assembly 1006 or the casing 1002 may be formed of the ceramic material according to embodiments of the disclosure.

While embodiments described herein refer to preceramic precursors of silicon carbide and silicon dioxide, the preceramic precursor of silicon dioxide may also be used with preceramic precursors of other ceramics, such as preceramic precursors of silicon carbide, preceramic precursors of silicon nitride, preceramic precursors of silicon hexaboride, preceramic precursors of aluminum nitride, preceramic precursors of boron nitride, preceramic precursors of boron carbide, preceramic precursors of titanium boride, preceramic precursors of titanium carbide, and preceramic precursors of hafnium carbide.

The following examples serve to explain embodiments of the disclosure in more detail. These examples are not to be construed as being exhaustive or exclusive as to the scope of this disclosure.

EXAMPLES

Example 1

Precursor Resin Formulation

A preceramic resin formulation including 100 parts of a polycarbosilane preceramic polymer commercially available from EEMS, LLC as CSO-110, 25 parts of a organically modified silicon dioxide preceramic polymer commercially available from Gelest, Inc. as VQM-246, and 1 part of a platinum catalyst commercially available from EEMS as CLC-PL005 was prepared. The CSO-110, VQM-246, and platinum catalyst were combined to produce the preceramic resin formulation including 80 wt % CSO-110 and 20 wt % of the VQM 246. A control formulation including only CSO-110 was also produced.

The preceramic resin formulation and the control formulation were exposed to 121° C. (250° F.) for 4 hours to cure the preceramic resin formulation and the control formulation, and then ceramified at a temperature of about 900° C. for 2 hours to produce the respective ceramic materials. A post-cure after the 121° C. (250° F.) cure was performed at 370° C. (700° F.) for an additional 4 hours.

Example 2

Ceramic Yield and Mechanical Integrity

Figure 2:
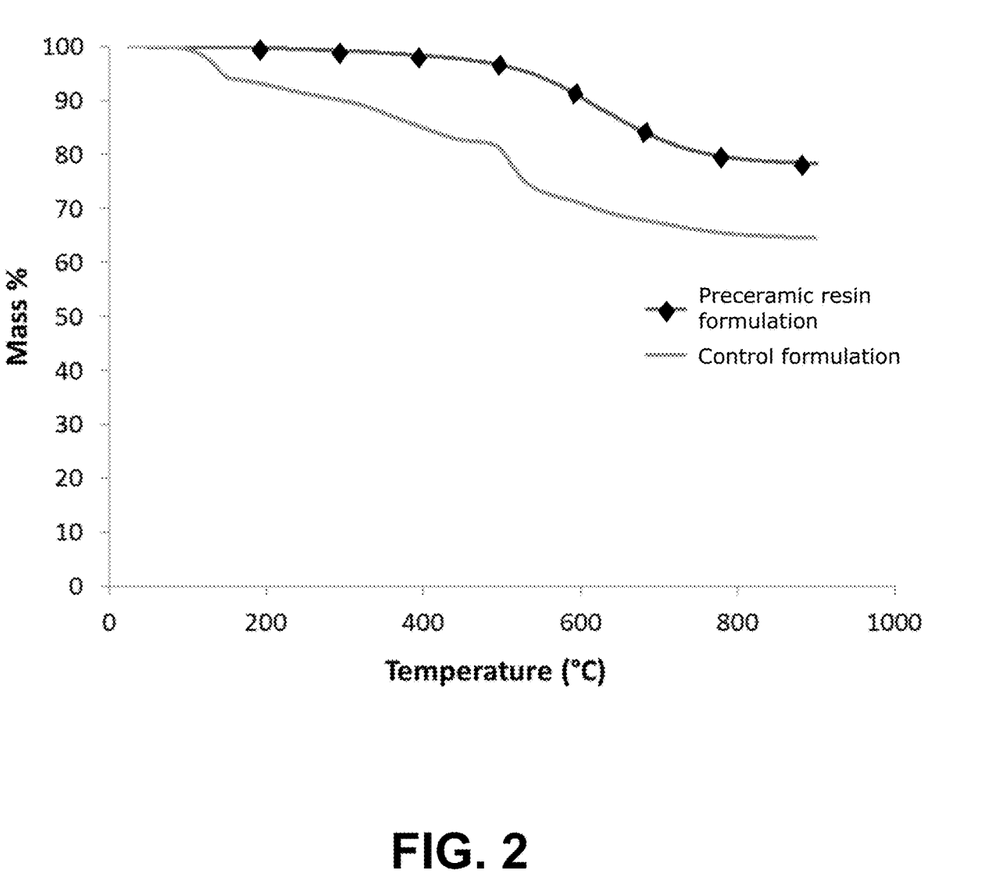
FIG. 2 is a thermogravimetric analysis (TGA) curve showing the mass percent as a function of temperature for the ceramic materials described in Example 1.

Thermogravimetric analysis (TGA) of the ceramic material formed from the preceramic resin formulation of Example 1 and the ceramified control formulation was conducted to determine the weight loss of the ceramic materials as a function of temperature. The TGA was conducted by conventional techniques. As shown in FIG. 2, the ceramic material formed from the preceramic resin formulation of Example 1 exhibited a 78.4% ceramic yield, while the ceramic material formed from the control formulation exhibited a 64.6% ceramic yield. Therefore, the ceramic material formed from the preceramic resin formulation of Example 1 had a 21.4% increase in mass retention compared to the ceramified control formulation including only the CSO-110. Thus, the ceramic yield of the ceramic material formed from the preceramic resin formulation of Example 1 was significantly increased compared to the ceramified control formulation.

Figure 3:
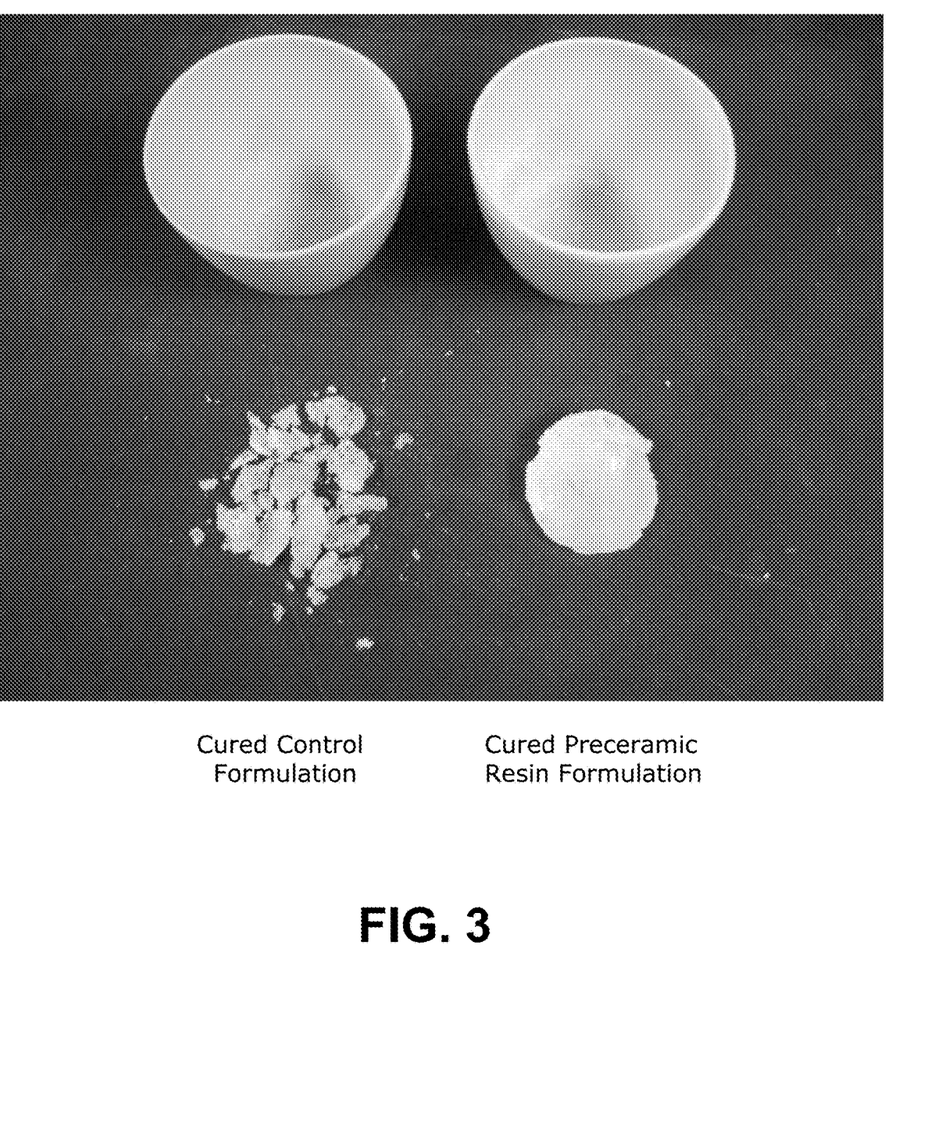
FIG. 3 is a photograph of the ceramic materials described in Example 1.

In addition to the increased ceramic yield, no cracking was observed with the cured preceramic resin formulation (cured at 250° F. for 4 hours) of Example 1, as shown in FIG. 3. The cured preceramic resin formulation formed from the polycarbosilane preceramic polymer and the organically modified silicon dioxide preceramic polymer exhibited net shape curing with no cracking. In contrast, the cured control formulation (cured at 250° F. for 4 hours) exhibited extensive cracking.

While the disclosure is susceptible to various modifications and alternative forms, specific embodiments have been shown by way of example in the drawings and have been described in detail herein. However, the disclosure is not intended to be limited to the particular forms disclosed. Rather, the disclosure encompasses all modifications, equivalents, and alternatives falling within the scope of the disclosure as defined by the following appended claims and their legal equivalents.

What is claimed is:

1. A ceramic material comprising a reaction product of a polycarbosilane preceramic polymer and an organically modified silicon dioxide preceramic polymer, the organically modified silicon dioxide preceramic polymer comprising monomers having the chemical structure of:

where each of $R_3$ and $R_4$ is independently a methyl ($CH_3$) group, a vinyl group ($CH_2$=CH) directly bonded to the silicon atom, or a vinyl group ($CH_2$=CH) bonded to the silicon atom by an alkyl linker, and n is an integer from 2 to 10,000.

2. The ceramic material of claim 1, wherein the ceramic material is configured as at least a portion of a rocket motor nozzle or a rocket motor casing.

3. The ceramic material of claim 1, wherein the ceramic material is configured as at least a portion of a turbine, a turbine blade, a turbine housing, a turbine engine vane, an insulating tile, a rotor blade, an insulation blanket, a compressor blade, a wing component, a fuselage skin, a landing gear, an exhaust nozzle, an engine exhaust duct, a nose cone, a re-entry shield, or a heat shield.

4. The ceramic material of claim 1, wherein the ceramic material comprises an oxidative resistant coating on a rocket motor nozzle or other high temperature aerostructure, a high temperature adhesive, a mortar material, an insulation, a thermal protection material, a thermal ablation material, or a matrix material of a ceramic matrix composite.

5. The ceramic material of claim 1, wherein the polycarbosilane preceramic polymer comprises a chemical structure of where $R_1$ and $R_2$ of each monomer is independently a hydrogen (H) group, a methyl ($CH_3$) group, a vinyl group ($CH_2$=CH) directly bonded to the silicon atom, or a vinyl group ($CH_2$=CH) bonded to the silicon atom by an alkyl linker, and n is an integer from 2 to 10,000 and an organically modified silicon dioxide preceramic polymer.

6. The ceramic material of claim 1, further comprising one or more of a filler and a pigment.

7. The ceramic material of claim 1, wherein one or more of $R_3$ and $R_4$ in at least a portion of the monomers comprises the vinyl group directly bonded to the silicon atom or the vinyl group bonded to the silicon atom by the alkyl linker.

8. A method of forming a preceramic resin formulation, comprising:

combining a polycarbosilane preceramic polymer and an organically modified silicon dioxide preceramic polymer with a crosslinking agent to form the preceramic resin formulation, the organically modified silicon dioxide preceramic polymer comprising monomers having the chemical structure of:

where each of $R_3$ and $R_4$ is independently a methyl ($CH_3$) group, a vinyl group ($CH_2$=CH) directly bonded to the silicon atom, or a vinyl group ($CH_2$=CH) bonded to the silicon atom by an alkyl linker, and n is an integer from 2 to 10,000.

9. The method of claim 8, wherein combining a polycarbosilane preceramic polymer and an organically modified silicon dioxide preceramic polymer with a crosslinking agent to form the preceramic resin formulation comprises combining the polycarbosilane preceramic polymer having a viscosity less than or equal to about 250 cP at a temperature of about 25° C. and the organically modified silicon dioxide preceramic polymer having a viscosity greater than or equal to about 2,500 cP at a temperature of about 25° C.

10. A method of forming a ceramic material, comprising:
forming a preceramic resin formulation comprising a polycarbosilane preceramic polymer, an organically modified silicon dioxide preceramic polymer, and a crosslinking agent;
reacting vinyl groups of the polycarbosilane preceramic polymer with silicon-hydrogen bonds of the organically modified silicon dioxide preceramic polymer to cure the preceramic resin formulation to form a cured preceramic resin formulation; and
ceramifying the cured preceramic resin formulation to form a ceramic material.

11. The method of claim 10, wherein reacting vinyl groups of the polycarbosilane preceramic polymer with silicon-hydrogen bonds of the organically modified silicon dioxide preceramic polymer comprises exposing the preceramic resin formulation to a temperature of from about 0° C. to about 400° C.

12. The method of claim 10, wherein ceramifying the cured preceramic resin formulation to form a ceramic material comprises forming the ceramic material at a ceramic yield of greater than about 70%.

13. The method of claim 10, further comprising forming the preceramic resin formulation into a shape before curing the preceramic resin formulation.

14. The method of claim 13, wherein forming the preceramic resin formulation into a shape before curing the preceramic resin formulation comprises forming the preceramic resin formulation into a component of a rocket motor nozzle before curing.

15. The method of claim 13, wherein forming the preceramic resin formulation into a shape before curing the preceramic resin formulation comprises forming the preceramic resin formulation into a turbine or a heat shield before curing.

16. An article, comprising:
a reaction product of a polycarbosilane preceramic polymer and an organically modified silicon dioxide preceramic polymer, the article configured as a component of a rocket motor or of a high temperature aerostructure, the organically modified silicon dioxide preceramic polymer comprising monomers having the chemical structure of:

where each of $R_3$ and $R_4$ is independently a methyl ($CH_3$) group, a vinyl group ($CH_2$=CH) directly bonded to the silicon atom, or a vinyl group ($CH_2$=CH) bonded to the silicon atom by an alkyl linker and n is an integer from 2 to 10,000.

17. The article of claim 16, wherein the article comprises at least a portion of a rocket motor nozzle or a rocket motor casing.

18. The article of claim 16, wherein the article comprises at least a portion of a turbine, a turbine blade, a turbine housing, a turbine engine vane, an insulating tile, a rotor blade, an insulation blanket, a compressor blade, a wing component, a fuselage skin, a landing gear, an exhaust nozzle, an engine exhaust duct, a nose cone, a re-entry shield, a laminate structure, or a heat shield.

19. The article of claim 16, wherein the article comprises an oxidative resistant coating on a rocket motor nozzle or other high temperature aerostructure, a high temperature adhesive, a mortar material, an insulation, a thermal protection material, a thermal ablation material, or a matrix material of a ceramic matrix composite.

20. The article of claim 16, wherein the reaction product comprises a ceramic yield of greater than about 70%.

* * * * *

UNITED STATES PATENT AND TRADEMARK OFFICE
CERTIFICATE OF CORRECTION

| | | |
|---|---|---|
| PATENT NO. | : 11,634,583 B2 | Page 1 of 1 |
| APPLICATION NO. | : 16/916374 | |
| DATED | : April 25, 2023 | |
| INVENTOR(S) | : Benjamin W. C. Garcia | |

It is certified that error appears in the above-identified patent and that said Letters Patent is hereby corrected as shown below:

In the Specification

Column 7,    Line 22,    change "catalyst e.g.," to --catalyst (e.g.,--

In the Claims

Claim 16,    Column 14,    Line 35,    change "linker and" to --linker, and--

Signed and Sealed this
Eighth Day of August, 2023

*Katherine Kelly Vidal*

Katherine Kelly Vidal
*Director of the United States Patent and Trademark Office*